US009821708B2

(12) United States Patent
Salter et al.

(10) Patent No.: US 9,821,708 B2
(45) Date of Patent: Nov. 21, 2017

(54) ILLUMINATED EXTERIOR STRIP

(71) Applicant: Ford Global Technologies, LLC, Dearborn, MI (US)

(72) Inventors: Stuart C. Salter, White Lake, MI (US); Paul Kenneth Dellock, Northville, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/795,398

(22) Filed: Jul. 9, 2015

(65) Prior Publication Data
US 2015/0307020 A1    Oct. 29, 2015

Related U.S. Application Data

(63) Continuation-in-part of application No. 14/686,156, filed on Apr. 14, 2015, which is a continuation-in-part of application No. 14/603,636, filed on Jan. 23, 2015, which is a continuation-in-part of application No. 14/086,442, filed on Nov. 21, 2013.

(51) Int. Cl.
*F21V 11/00* (2015.01)
*B60Q 1/26* (2006.01)
*B60R 13/04* (2006.01)
*H05B 37/02* (2006.01)
*B60Q 1/32* (2006.01)
*F21S 8/10* (2006.01)

(52) U.S. Cl.
CPC ............ *B60Q 1/2696* (2013.01); *B60Q 1/26* (2013.01); *B60Q 1/2615* (2013.01); *B60Q 1/2669* (2013.01); *B60Q 1/323* (2013.01); *B60R 13/04* (2013.01); *F21S 48/215* (2013.01); *F21S 48/2212* (2013.01); *H05B 37/0218* (2013.01); *H05B 37/0227* (2013.01); *Y02B 20/46* (2013.01)

(58) Field of Classification Search
CPC .... B60Q 3/004; B60Q 1/2661; B60Q 1/0041; B60Q 3/0289
USPC .................................................. 362/459–549
See application file for complete search history.

(56) References Cited

U.S. PATENT DOCUMENTS

| 2,486,859 | A |   | 11/1949 | Meijer et al. |
| 4,443,832 | A | * | 4/1984 | Kanamori ................ B60Q 1/26 362/487 |
| 5,053,930 | A |   | 10/1991 | Benavides |

(Continued)

FOREIGN PATENT DOCUMENTS

| CN | 101337492 A | 1/2009 |
| CN | 201169230 Y | 2/2009 |

(Continued)

*Primary Examiner* — William Carter
(74) *Attorney, Agent, or Firm* — Jason Rogers; Price Heneveld LLP

(57) ABSTRACT

A lighting system for a vehicle panel is provided herein. The lighting system includes an outer panel mated to an inner panel. An aperture is disposed in the outer panel. A light-producing assembly is arranged as a strip and includes a plurality of light sources. A photoluminescent structure is configured to luminesce in response to excitation by the plurality of light sources. A retention feature is coupled to the light-producing assembly and insertable through the aperture for disposing the light-producing assembly on the outer panel.

19 Claims, 11 Drawing Sheets

(56) References Cited

U.S. PATENT DOCUMENTS

| | | | |
|---|---|---|---|
| 5,709,453 A | 1/1998 | Krent et al. | |
| 5,839,718 A | 11/1998 | Hase et al. | |
| 5,848,837 A | 12/1998 | Gustafson | |
| 6,031,511 A | 2/2000 | DeLuca et al. | |
| 6,117,362 A | 9/2000 | Yen et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,264,366 B2 | 9/2007 | Hulse | |
| 7,264,367 B2 | 9/2007 | Hulse | |
| 7,441,914 B2 | 10/2008 | Palmer et al. | |
| 7,484,870 B2 | 2/2009 | Pederson | |
| 7,501,749 B2 | 3/2009 | Takeda et al. | |
| 7,575,349 B2 | 8/2009 | Bucher et al. | |
| 7,621,662 B1 | 11/2009 | Colbert | |
| 7,635,212 B2 | 12/2009 | Seidler | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,075,169 B2 | 12/2011 | Englander | |
| 8,097,843 B2 | 1/2012 | Agrawal et al. | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2004/0264166 A1* | 12/2004 | Chien | B60R 11/00 362/487 |
| 2005/0013140 A1 | 1/2005 | Currie | |
| 2005/0068783 A1 | 3/2005 | Egashira et al. | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0110954 A1 | 5/2007 | Whitehead | |
| 2007/0285938 A1 | 12/2007 | Palmer et al. | |
| 2007/0297045 A1 | 12/2007 | Sakai et al. | |
| 2009/0129107 A1* | 5/2009 | Egerer | B60R 13/02 362/509 |
| 2009/0219730 A1 | 9/2009 | Syfert et al. | |
| 2009/0251920 A1 | 10/2009 | Kino et al. | |
| 2009/0257241 A1* | 10/2009 | Meinke | B60Q 1/2669 362/546 |
| 2009/0260562 A1 | 10/2009 | Folstad et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0081915 A1* | 4/2012 | Foote | B60R 1/12 362/494 |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0092965 A1 | 4/2013 | Kijima et al. | |
| 2013/0335994 A1 | 12/2013 | Mulder et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1* | 7/2014 | Cannon | B60Q 3/002 362/488 |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0236613 A1 | 8/2016 | Trier | |

FOREIGN PATENT DOCUMENTS

| | | |
|---|---|---|
| CN | 201193011 Y | 2/2009 |
| CN | 102176486 A | 9/2011 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 0611040 A1 | 8/1994 |
| EP | 1793261 A1 | 6/2007 |
| EP | 2577153 A1 | 4/2013 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

\* cited by examiner

ILLUMINATED EXTERIOR STRIP

CROSS-REFERENCE TO RELATED APPLICATIONS

This application is a continuation-in-part of U.S. patent application Ser. No. 14/686,156, filed Apr. 14, 2015, entitled "ILLUMINATING DECAL FOR VEHICLE," which is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a body panel for a vehicle is disclosed. The body panel includes a panel having an aperture provided therein. A light-producing assembly comprising a plurality of light sources is arranged as a strip is attached to the panel. A photoluminescent structure on the light-producing assembly is configured to luminesce in response to excitation by the plurality of light sources. The plurality of light sources is dispersed in a variable density along the strip.

According to another aspect of the present invention, a lighting system for a vehicle panel is disclosed. The lighting system includes a panel having a first surface. A light-producing assembly is disposed on the first surface of the panel and includes a plurality of light sources. A photoluminescent structure is disposed on the panel and is configured to luminesce in response to excitation by the plurality of light sources. An overmold material is disposed over a portion of the light-producing assembly and extends over a second surface of the panel.

According to yet another aspect of the present invention, a lighting system for a vehicle is disclosed. The lighting system includes a first light-producing assembly disposed on a first panel of a vehicle. A second light-producing assembly is disposed on a second panel of a vehicle. The first and second light-producing assemblies each includes a plurality of light sources dispersed at variable densities therein and a photoluminescent structure configured to luminesce in response to excitation by the plurality of light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system configured to attach to an exterior portion of a vehicle. The lighting system may advantageously employ one or more photoluminescent structures to illuminate in response to pre-defined events. The one or more photoluminescent structures may be configured to convert light received from an associated light source 38 and re-emit the light at a different wavelength typically found in the visible spectrum. In some embodiments, the light source 38 may implement a thin design, thereby helping to fit the light source 38 into small package spaces of the vehicle where traditional light sources may not be practicable and/or substantially concealing the lighting system in the unilluminated state.

Figure 1:
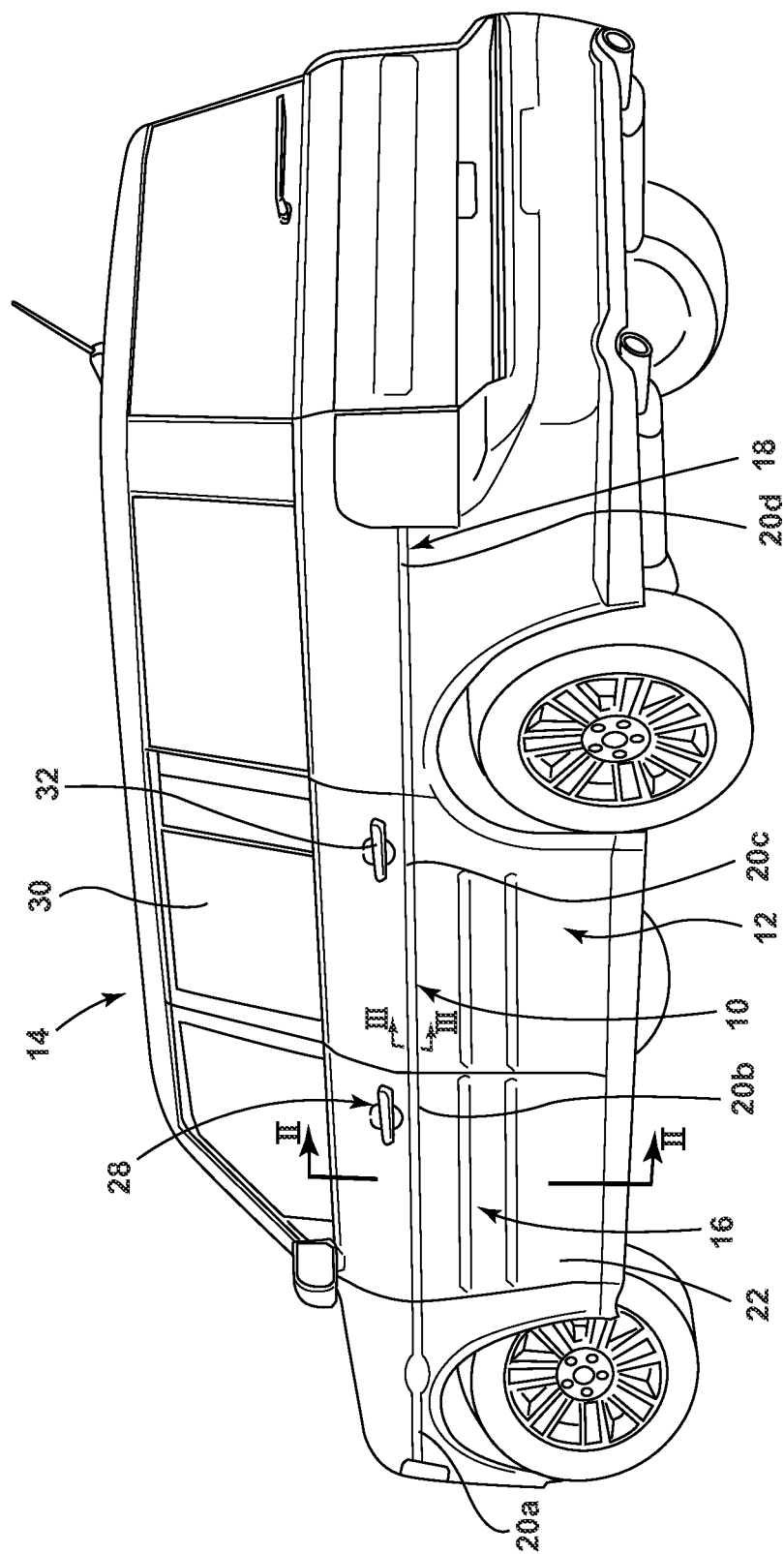
FIG. 1 illustrates a perspective view of a vehicle exterior employing a lighting system on a body panel according to one embodiment.

Referring to FIG. 1, a lighting system 10 attached to a panel 12 of a vehicle 14 that is configured to illuminate an exterior portion 16 of the vehicle 14 is illustrated, according to one embodiment. As shown in FIG. 1, the lighting system 10 is arranged as an elongated light strip 18 extending longitudinally along a portion of the vehicle 14. The light strip 18 may include a single portion of may comprise a plurality of portions 20a, 20b, 20c, 20d to form the elongated light strip 18. Each light strip 18 may be arranged as a door or body accent and may be disposed proximate to one or more vehicle features 28, such as a window 30 or a door handle 32 disposed on the vehicle 14. For example, the light strips 18 may be positioned below the door handle 32 and may each illuminate in a plurality of colors and intensities based on occupant preferences and/or vehicle-related conditions.

According to one embodiment, the light strip(s) 18 may be configured to luminesce in response to excitation by light emitted from a light source 38. The luminescence exhibited by the light strip 18 may provide one or more distinct lighting functions. For instance, the light strip 18 may luminesce in a first color to function simply as a styling element. In another instance, the light strip 18 may luminesce in a second color that is visually distinct from the first color to illuminate a feature 28 of the vehicle 14. For example, the light strip 18 may illuminate the door handle(s) 32 inner panel 34 of the vehicle 14 as an occupant approaches the vehicle 14. Alternatively, the light strip 18 may be configured to function as a turn signal. While not shown, it should be understood that one or more light strips 18 may be similarly provided on the passenger side doors and body. It should also be understood that light strips 18 may additionally, or alternatively, be provided in other vehicle 14 locations such as, but not limited to, the front, rear, bottom, roof, exterior, and/or interior portions of the vehicle 14.

Figure 2:
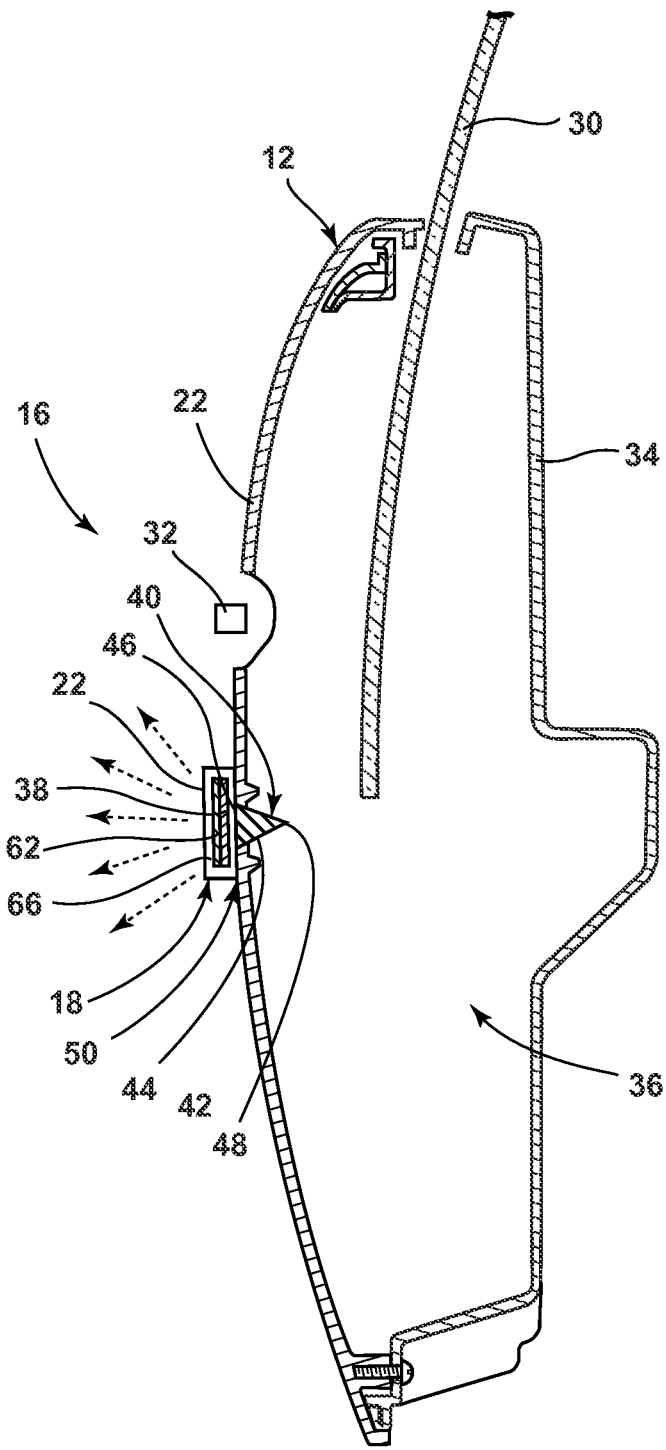
FIG. 2 is a cross-sectional view of the body panel showing the lighting system attached to the vehicle through the use of a retention feature.

Referring to FIG. 2, a cross-sectional view taken along the line II-II of FIG. 1 illustrating a vehicle body panel 12 employing the lighting system 10 is shown. The body panel 12 includes an outer panel 22 and an inner panel 34 which are assembled and connected together at peripheral portions. The inner panel 34 may be a metallic material, or alternatively, the inner panel 34 may be a non-metallic material, such as a carbon fiber composite, carbon fiber reinforced polymer, or a polymeric material. The inner panel 34 may be molded into a predetermined shape using conventional molding processes. In addition, the inner panel 34 may be a single piece or assembled from multiple pieces. The outer panel 22 may be a metallic material, such as aluminum, steel, or titanium, and/or any other practicable material known in the art. In one embodiment, the outer panel 22 may be made from any suitable manufacturing process such as stamping. In addition, the outer panel 22 may be assembled from multiple parts that are connected to each other using adhesives, rivets, welding, or the like.

Additional components of the vehicle 14 may be disposed between the outer and inner panels 34, such as, but not limited to a window 30 that articulates within a cavity 36 formed by the outer and inner panels 22, 34 and additional wiring for electrical components disposed within the vehicle 14.

As illustrated, the light strip 18 is disposed beneath the door handle 32 of the vehicle 14. The light strip 18 may be configured to illuminate upwardly towards the door handle 32, downwardly along the panel 12, outwardly from the vehicle 14, and/or any combination thereof. When illuminated, the light strip 18 may provide ambient lighting proximate an exterior portion 16 of the vehicle 14, illuminate a feature 28 of the vehicle 14, provide information about the vehicle 14, and/or provide any additional benefit to an occupant. As will be described in more detail below, the lighting system 10 may further be configured to illuminate a plurality of features 28 with varying colors and intensities of light.

A light source 38 may be disposed on and/or within the light strip 18 and oriented such that light may be emitted therefrom. The light source 38 may comprise any form of light source 38, for example fluorescent lighting, light emitting diodes (LEDs), organic LEDs (OLEDs), polymer LEDs (PLEDs), solid state lighting, and/or any other form of lighting device.

According to one embodiment, a photoluminescent structure 62 may be applied or otherwise arranged on and/or proximate the light source 38. The light source 38 may be configured to emit light towards a target location. The emitted light may be converted by the photoluminescent structure 62 and re-emitted as light having a different wavelength, typically in the visible spectrum. According to the illustrated embodiment, the target location is an area disposed proximately to an exterior portion 16 of the vehicle 14. Such a configuration may illuminate desired features of the vehicle 14 when the lighting system 10 is in the illuminated state. It is contemplated that the lighting system 10 may have a wide range of target locations such that the lighting system 10 may be used for a plurality of functions. Exemplary functions include usage as a puddle lamp, ambient lighting, a turn signal, and/or an alert to notify the occupants of the vehicle 14 about a specified vehicle-related condition. It should be appreciated that in some embodiments, the lighting system 10 described herein need not incorporate a photoluminescent structure 62.

The lighting strip 18 may be attached to the vehicle 14 through any means known in the art. According to one embodiment, a retention feature 40 for securing the light strip 18 to the body panel 12 of the vehicle 14 includes an elongate clip 42 extending from the trim component and configured to be inserted through an aperture 44 defined by the outer panel 22. The retention feature 40 further includes a selectively releasable locking device configured to transition between a locked state and an unlocked state and is configured to obstruct the withdrawal of the elongate clip 42 from the outer panel 22 when in the locked state.

The clip 42 may include a proximal portion 46 secured to the light strip 18 and a distal portion 48 including a retaining structure. The retaining structure is configured to obstruct the withdrawal of the clip 42 through the aperture 44 by physically interfering with the passage of the retaining structure through the aperture 44. The clip 42 may be configured to be inserted through the aperture 44 such that the light strip 18 abuts the exterior portion 16 of the outer panel 22. As such, the clip 42 may be positioned such that the light strip 18 conceals the clip 42.

Alternatively, or additionally, an adhesive may be applied to a rear portion 50 of the light strip 18 that is then attached to the desired location of the vehicle panel 12 of the vehicle 14. Alternatively still, the light strip 18 may be over molded, or otherwise attached, to a portion of the vehicle panel 12. According to the one embodiment, the light source 38 may be placed in a mold and an overmold material 66 may be disposed there over. In embodiments where the overmold material 66 is cured under pressure, the overmold material 66 may be applied to the light strip 18 in a partly-cured condition. In one embodiment, the over molding process includes applying the overmold material 66 onto at least a part of the combination of the lighting system by spraying, brushing, dipping, printing, laminating or rolling, followed by curing the overmold material 66. In some embodiments, the overmold material 66 may include a plastic, silicon, urethane material, or any other material that may be advantageous or structurally sound for placement within a repetitive contact zone. Further, the overmold material 66 may be of any color and material and, in some embodiments, may be of a thickness such that the light strip 18 may function as a molding member on the vehicle 14.

Figure 3A:
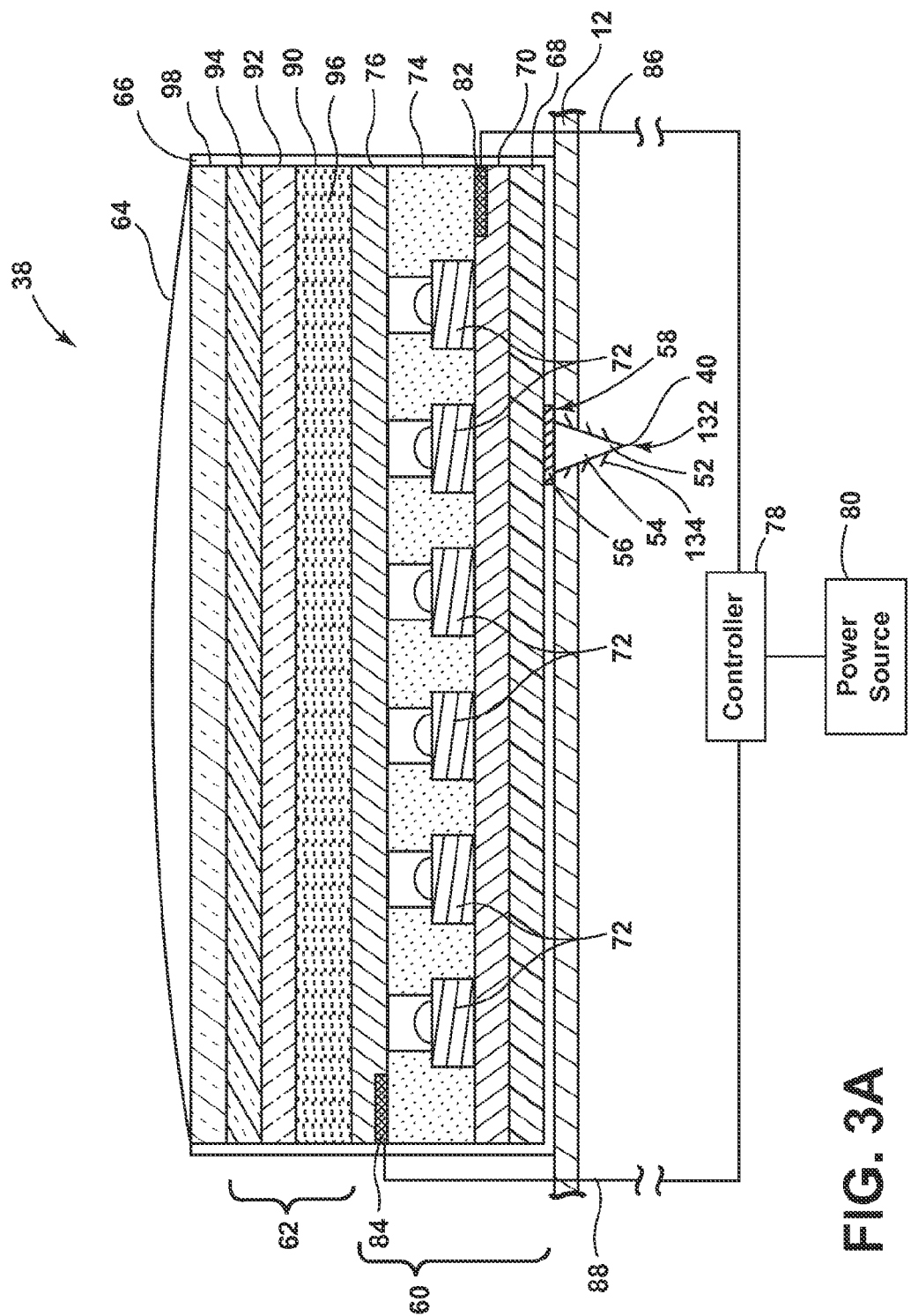
FIG. 3A is a cross-sectional view taken along line III-III of FIG. 1 illustrating a light source according to one embodiment.

Referring to FIGS. 3A-3E, a cross-sectional view of the light source 38 capable of use on a vehicle 14 with an external photoluminescent structure 62 is shown according to one embodiment. As illustrated in FIG. 3A, the light source 38 may have a stacked arrangement that includes a light-producing assembly 60, a photoluminescent structure 62, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle 14 surface on which the light source 38 is to be received (e.g., outer panel 22). Alternatively, as a cost saving measure, the substrate 68 may directly correspond to a preexisting vehicle structure (e.g., outer panel 22, and/or interior panels).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 76 may be arranged over the aforementioned semiconductor ink 74. Likewise, additional components, such as the bus bars 82, 84 may also be placed in any orientation such that the light-producing assembly 60 may emit light 100 towards a desired location.

The LED sources 72 may be dispersed in a random or controlled fashion within the semiconductor ink 74 and may be configured to emit focused or non-focused light toward the photoluminescent structure 62. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3A, the photoluminescent structure 62 is arranged over the negative electrode 76 as a coating, layer, film or other suitable deposition. With respect to the presently illustrated embodiment, the photoluminescent structure 62 may be arranged as a multi-layered structure including an energy conversion layer 90, optional stability layer 92, and optional protection layer 94.

The energy conversion layer 90 includes at least one photoluminescent material 96 having energy converting elements with phosphorescent or fluorescent properties. For example, the photoluminescent material 96 may include organic or inorganic fluorescent dyes including rylenes, xanthenes, porphyrins, phthalocyanines. Additionally, or alternatively, the photoluminescent material 96 may include phosphors from the group of Ce-doped garnets such as YAG:Ce. The energy conversion layer 90 may be prepared by dispersing the photoluminescent material 96 in a polymer matrix to form a homogenous mixture using a variety of methods. Such methods may include preparing the energy conversion layer 90 from a formulation in a liquid carrier medium and coating the energy conversion layer 90 to the negative electrode 76 or other desired substrate 68. The energy conversion layer 90 may be applied to the negative electrode 76 by painting, screen printing, flexography, spraying, slot coating, dip coating, roller coating, bar coating, and/or any other methods known in the art. Alternatively, the energy conversion layer 90 may be prepared by methods that do not use a liquid carrier medium. For example, the energy conversion layer 90 may be rendered by dispersing the photoluminescent material 96 into a solid state solution (homogenous mixture in a dry state) that may be incorporated in a polymer matrix formed by extrusion, injection seal, compression seal, calendaring, thermoforming, etc.

To protect the photoluminescent material 96 contained within the energy conversion layer 90 from photolytic and thermal degradation, the photoluminescent structure 62 may include the stability layer 92. The stability layer 92 may be configured as a separate layer optically coupled and adhered to the energy conversion layer 90 or otherwise integrated therewith. The photoluminescent structure 62 may also include the protection layer 94 optically coupled and adhered to the stability layer 92 or other layer (e.g., the energy conversion layer 90 in the absence of the stability layer 92) to protect the photoluminescent structure 62 from physical and chemical damage arising from environmental exposure. The stability layer 92 and/or the protection layer 94 may be combined with the energy conversion layer 90 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 96 is formulated to become excited upon receiving inputted light of a specific wavelength from at least a portion of the LED sources 72 of the light-producing assembly 60. As a result, the inputted light undergoes an energy conversion process and is re-emitted at a different wavelength. According to one embodiment, the photoluminescent material 96 may be formulated to convert inputted light into a longer wavelength light, otherwise known as down conversion. Alternatively, the photoluminescent material 96 may be formulated to convert inputted light into a shorter wavelength light, otherwise known as up conversion. Under either approach, light converted by the photoluminescent material 96 may be immediately outputted from the photoluminescent structure 62 or otherwise used in an energy cascade, wherein the converted light serves as inputted light to excite another formulation of photoluminescent material 96 located within the energy conversion layer 90, whereby the subsequent converted light may then be outputted from the photoluminescent structure 62 or used as inputted light, and so on. With respect to the energy conversion processes described herein, the difference in wavelength between the inputted light 100 and the converted light 102 is known as the Stokes shift and serves as the principle driving mechanism for an energy conversion process corresponding to a change in wavelength of light.

With continued reference to FIG. 3A, the viewable portion 64 is arranged over the photoluminescent structure 62. In some embodiments, the viewable portion 64 may include a plastic, silicon, or urethane material and is molded over the photoluminescent structure 62 and light-producing assembly 60. Preferably, the viewable portion 64 should be at least partially light transmissible. In this manner, the viewable portion 64 will be illuminated by the photoluminescent structure 62 whenever an energy conversion process is underway. Additionally, by over-sealing the viewable portion 64, it may also function to protect the photoluminescent structure 62 and the light-producing assembly 60. The viewable portion 64 may be arranged in a planar shape and/or an arcuate shape to enhance its viewing potential when in a luminescent state. Like the photoluminescent structure 62 and the light-producing assembly 60, the viewable portion 64 may also benefit from a thin design, thereby helping to fit the light source 38 into small package spaces of the vehicle 14.

In some embodiments, a decorative layer 98 may be disposed between the viewable portion 64 and the photoluminescent structure 62. The decorative layer 98 may include a polymeric material or other suitable material and is configured to control or modify an appearance of the viewable portion 64 of the light source 38. For example, the decorative layer 98 may be configured to confer an appearance of a trim component on the vehicle 14 to the viewable portion 64 when the viewable portion 64 is in an unilluminated state. In other embodiments, the decorative layer 98 may be tinted any color to complement the vehicle 14 structure on which the light source 38 is to be received. For example, the decorative layer 98 may be similar in color to that of the vehicle panel 12 so that the lighting system 10 is substantially hidden when in the unilluminated state. In any event, the decorative layer 98 should be at least partially light transmissible such that the photoluminescent structure 62 is not prevented from illuminating the viewable portion 64 whenever an energy conversion process is underway.

The overmold material 66 is disposed around the light-producing assembly 60 and photoluminescent structure 62. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the repetitive strikes that may occur when the occupants ingress and egress from the vehicle 14. It is also contemplated that the viewable portion 64 may be formed by a portion of the overmold material 66.

In some embodiments, the photoluminescent structure 62 may be employed separate and away from the light-producing assembly 60. For example, the photoluminescent structure 62 may be positioned on a vehicle feature 28 or surface proximate (e.g., surface 156 of outer panel 22), but not in physical contact, with the light-producing assembly 60. It should be understood that in embodiments where the photoluminescent structure 62 is incorporated into distinct components separated from the light source 38, the light source 38 may still have the same or similar structure to the light source 38 described in reference to FIG. 3A.

Still referring to FIG. 3A, a retention feature 40 is configured as a connector 52, according to one embodiment, is attached to a portion of the light-producing assembly. The connector is further configured to couple to a panel 12 (e.g., outer panel 22, inner panel 34) of the vehicle 14. The connector 52 may include a connector body 54 having a head portion 56 formed at a proximal portion 58 thereof which is configured to mount with the rear portion 50 of the light-producing assembly 60. In the mounted position, the connector 52 extends outwardly from the rear portion 50 of the light-producing assembly 60 and through the outer panel 22 of the vehicle 14 as shown in FIG. 1.

In one embodiment, the distal portion 132 of the connector 52 is configured to mount within a corresponding aperture 44 provided in the outer panel 22 to secure the light strip 18 thereto. The distal portion 132 may include outwardly extending projections 134, which are configured to mount with the vehicle 14 support to secure the light strip 18 to the vehicle 14. Of course, other configurations of the connector 52 are possible as well without departing from the spirit and scope of the present disclosure.

Figure 3B:
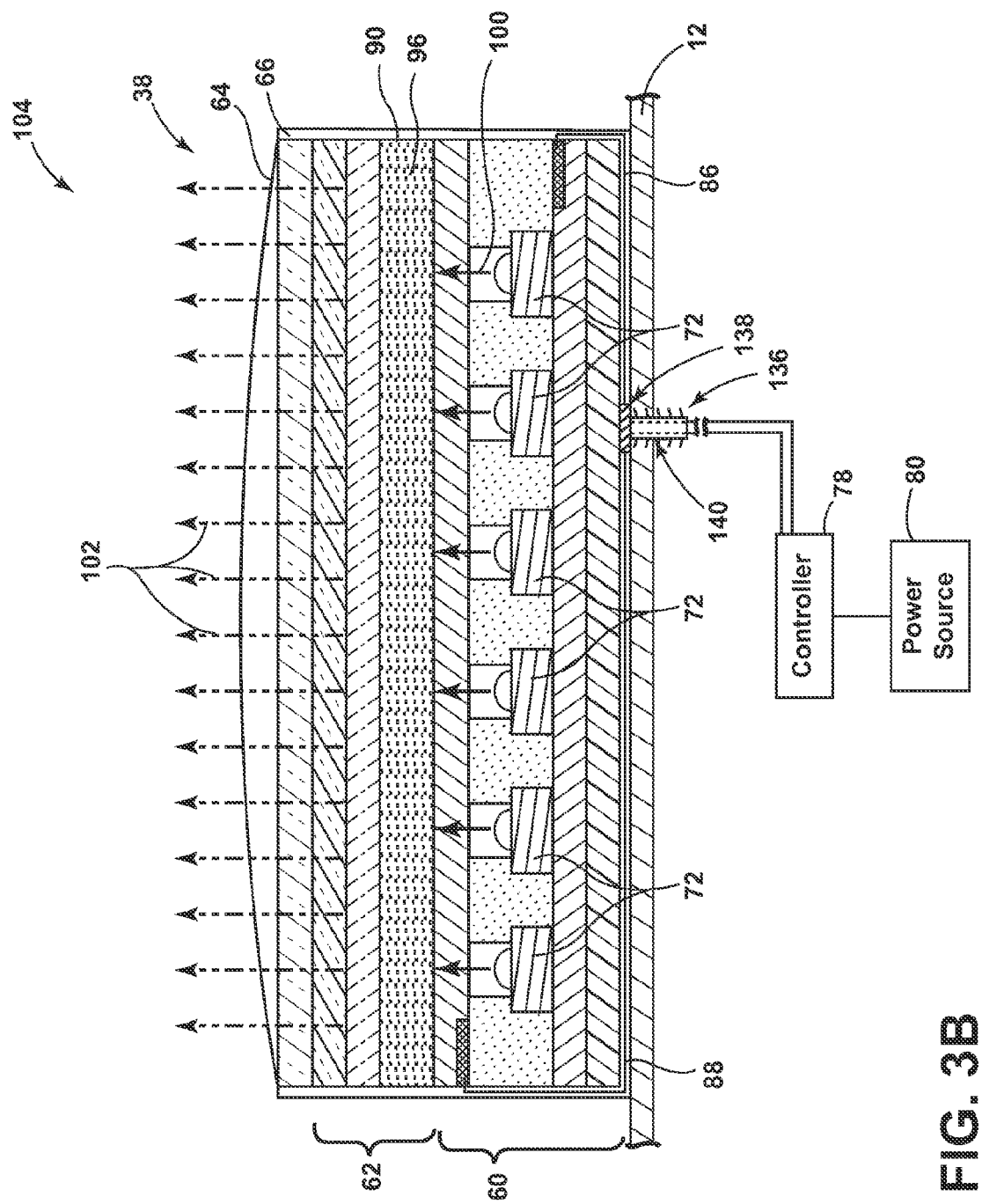
FIG. 3B is a cross-sectional view taken along line III-III of FIG. 1 further illustrating an the light source, according to one embodiment.

Referring to FIG. 3B, an energy conversion process 104 for producing single color luminescence is illustrated according to one embodiment. For purposes of illustration, the energy conversion process 104 is described below using the light source 38 depicted in FIG. 3A. In this embodiment, the energy conversion layer 90 of the photoluminescent structure 62 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application. The converted visible light 102 is outputted from the light source 38 via the viewable portion 64, thereby causing the viewable portion 64 to illuminate in the desired color. In one embodiment, the energy conversion process is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the viewable portion 64 may offer a unique, substantially uniform, and/or attractive viewing experience that may be difficult to duplicate through non-photoluminescent means.

Still referring to FIG. 3B, a retention feature 40 is configured as a hollow connector 136 that is attached to a portion of the light-producing assembly on a first portion 138. The hollow connector 136 is further configured to couple to a body panel 12 of the vehicle 14 on a second portion 140. The conductive leads 86, 88, according to one embodiment, may be positioned through the hollow central portion in the connector 136 and thereafter electrically coupled to the controller 78 on the opposing side of the outer panel 22 from which the light strip 18 is disposed.

Figure 3C:
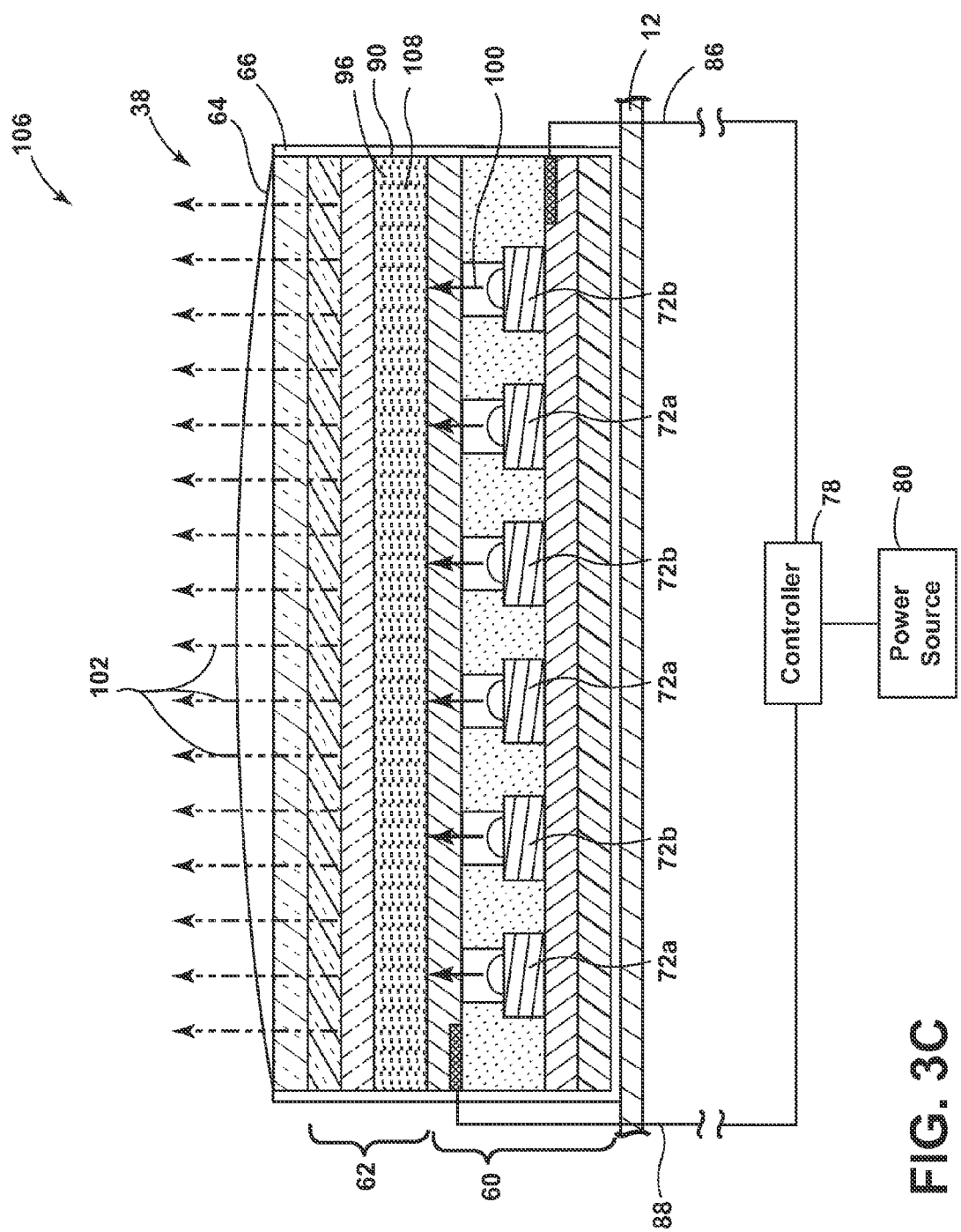
FIG. 3C is a cross-sectional view taken along line III-III of FIG. 1 illustrating an alternate light source, according to one embodiment.

Referring to FIG. 3C, a second energy conversion process 106 for generating multiple colors of light is illustrated according to one embodiment. For consistency, the second energy conversion process 106 is also described below using the light source 38 depicted in FIG. 3A. In this embodiment, the energy conversion layer 90 includes the first and second photoluminescent materials 96, 108 that are interspersed within the energy conversion layer 90. Alternatively, the photoluminescent materials 96, 108 may be isolated from each other if desired. Also, it should be appreciated that the energy conversion layer 90 may include more than two different photoluminescent materials 96 and 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 96 and results in the inputted light 100 being converted into a visible light 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72a and 72b may be selectively activated using the controller 78 to cause the photoluminescent structure 62 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each light source 38 may also be proportionally varied to one another such that additional colors may be obtained. For energy conversion layers containing more than two distinct photoluminescent materials, a greater diversity of colors may be achieved. Contemplated colors include red, green, blue, and combinations thereof, including white, all of which may be achieved by selecting the appropriate photoluminescent materials and correctly manipulating the corresponding LED sources 72.

Figure 3D:
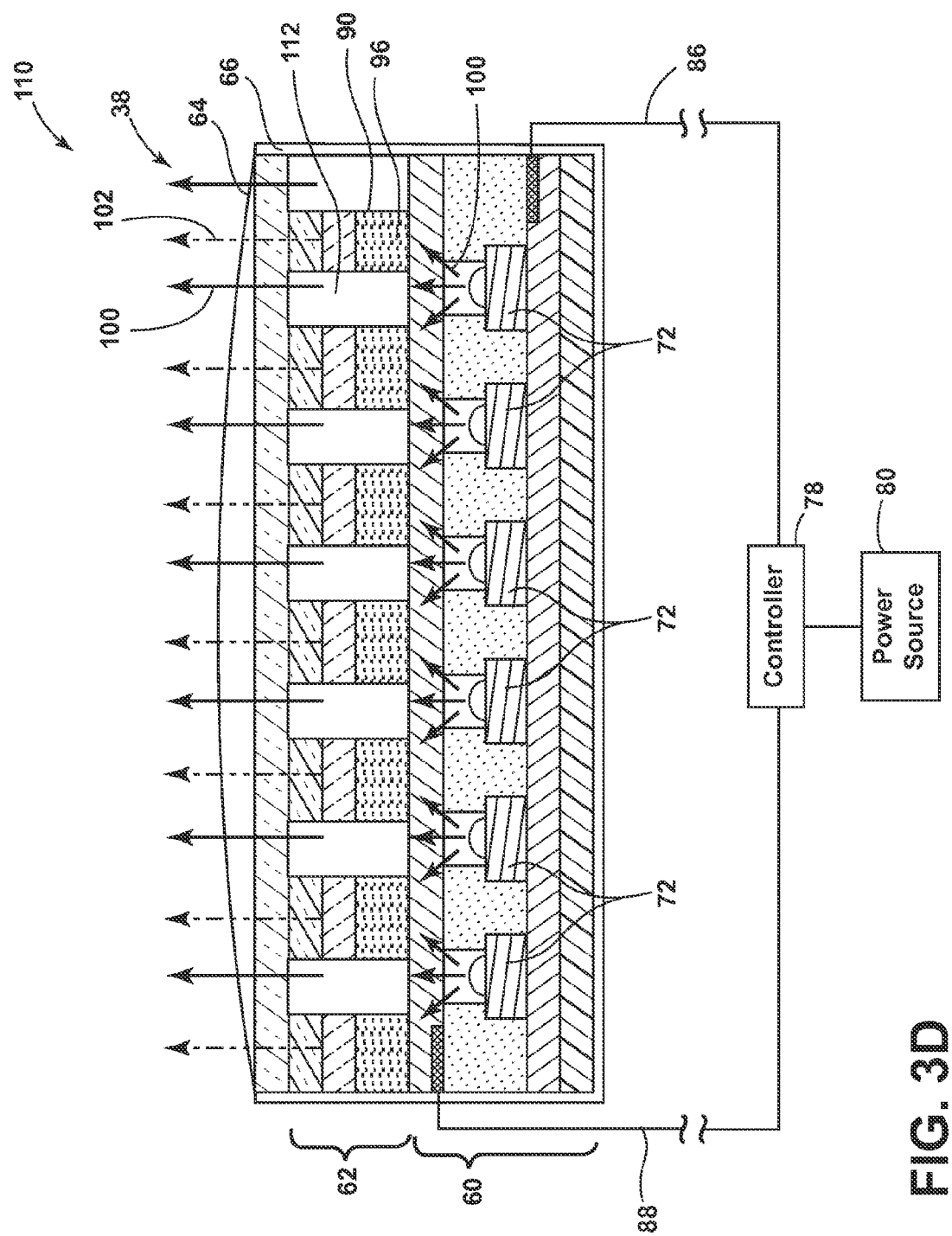
FIG. 3D is a cross-sectional view taken along line III-III of FIG. 1 illustrating a light source having a luminescent structure separated by light transmissive portions disposed on the light source, according to one embodiment.

Referring to FIG. 3D, a third energy conversion process 110 includes a light-producing assembly 60, such as the one described in reference to FIG. 3A, and a photoluminescent structure 62 disposed thereon is illustrated, according to an alternate embodiment. The photoluminescent structure 62 is configured to convert inputted light 100 received from LED sources 72 into a visible light 102 having a wavelength different than that associated with the inputted light 100. More specifically, the photoluminescent structure 62 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application.

The photoluminescent structure 62 may be applied to only a portion of the light-producing assembly 60, for example, in a stripped manner. Between the photoluminescent structures 62 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 62 disposed proximate to the light-producing assembly 60. The second photoluminescent structure 62 may be configured to luminesce in response to the inputted light 100 that is directed through the light transmissive portions 112.

Figure 3E:
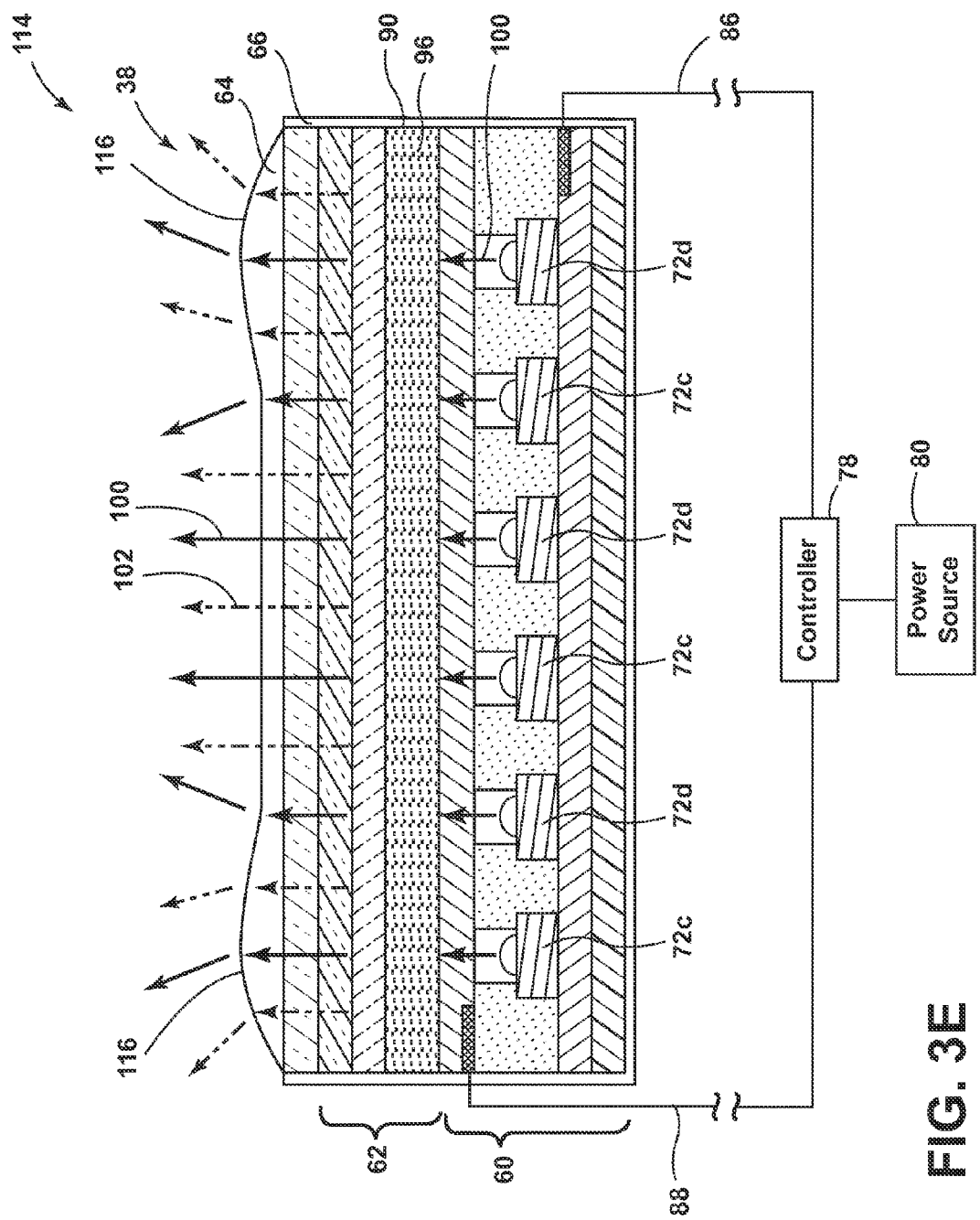
FIG. 3E is a cross-sectional view taken along line III-III of FIG. 1 illustrating an alternate light source having a luminescent structure disposed on the light source configured to convert a portion of light emitted from the light source from a first wavelength to a second wavelength, according to one embodiment.

Referring to FIG. 3E, a fourth energy conversion process 114 for generating multiple colors of light utilizing the light-producing assembly 60, such as the one described in reference to FIG. 3A, and a photoluminescent structure 62 disposed thereon is illustrated. In this embodiment, the photoluminescent structure 62 is disposed over a top portion of the light-producing assembly 60. The excitation of photoluminescent material 96 is formulated such that a portion of inputted light 100 emitted from the LED sources 72 passes through the photoluminescent structure 62 at the first wavelength (i.e., the inputted light 100 emitted from the light source 38 is not converted by the photoluminescent structure 62). The intensity of the emitted light 100 may be modified by pulse-width modulation or current control to vary the amount of inputted light 100 emitted from the LED sources 72 that passes through the photoluminescent structure 62 without converting to a second, outputted 102 wavelength. For example, if the light source 38 is configured to emit light 100 at a low level, substantially all of the light 100 may be converted to the second wavelength 102. In this configuration, a color of light 102 corresponding to the photoluminescent structure 62 may be emitted from the light-producing assembly 60. If the light source 38 is configured to emit inputted light 100 at a high level, only a portion of the first wavelength may be converted by the photoluminescent structure 62. In this configuration, a first portion of the emitted light 100 may be converted by the photoluminescent structure 62 and a second portion of the light 100 may be emitted from the light-producing assembly 60 at the first wavelength towards additional photoluminescent structures 62 disposed proximately to the light source 38. The additional photoluminescent structures 62 may luminesce in response to the light 100 emitted from the light source 38.

According to one exemplary embodiment, a first portion of the LED sources 72, exemplarily shown as LED sources 72a is configured to emit an inputted light 100 having a wavelength that excites the photoluminescent material 96 within the photoluminescent structure 62 and results in the inputted light 100 being converted into a visible light 102 of a first color (e.g., white). Likewise, a second portion of the LED sources 72, exemplarily shown as LED sources 72c, is configured to emit an inputted light 100 having a wavelength that passes through the photoluminescent structure 62 and excites additional photoluminescent structures 62 disposed proximately to the lighting system 10 thereby illuminating in a second color. The first and second colors may be visually distinguishable from one another. In this manner, LED sources 72a and 72c may be selectively activated using the controller 78 to cause the lighting system 10 to luminesce in a variety of colors.

The light-producing assembly 60 may also include optics 116 that are configured to direct light 100 emitted from the LED sources 72a, 72c and the light 102 emitted from the photoluminescent structure 62 towards pre-defined locations. For example, light 100 emitted from the LED sources 72a, 72c and the photoluminescent structure 62 may be directed and/or focused towards a desired feature 28 and/or location proximate to the light source 38.

Figure 4:
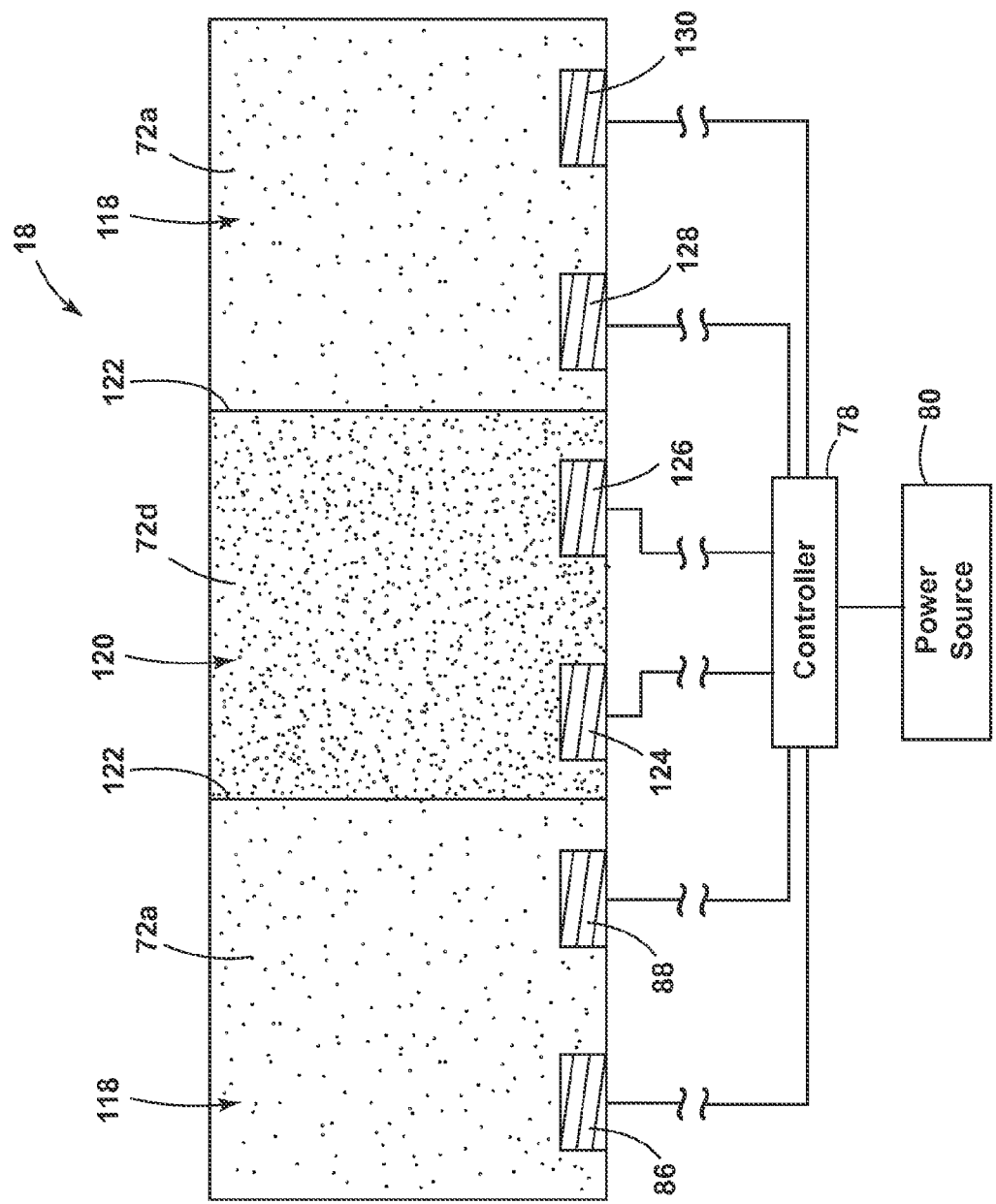
FIG. 4 illustrates a top view of a light-producing assembly, according to one embodiment, having varying types and concentrations of LED sources transversely along the light-producing assembly.

Referring to FIG. 4, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72d that are configured to emit an inputted light 100 having an emission wavelength in a first color (e.g., white) spectrum. Likewise, a second portion 120 of the light-producing assembly 60 includes LED sources 72d that are configured to emit an inputted light 100 having an emission wavelength in a second color (e.g., red) spectrum. The first and second portions of the light-producing assembly 60 may be separated by insulative, or non-conductive, barriers 122 from proximately disposed portions through any means known in the art such that each portion 118, 120 may be illuminated independently of any other portion 118, 120. Further, each portion 118, 120 disposed within the light-producing assembly 60 may include a respective bus bar 82, 84, 124, 126, 128, 130 coupled to the controller 78 and configured to illuminate each respective portion 118, 120.

Preferably, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently.

As described above, a photoluminescent structure 62 may be disposed on a portion of the light-producing assembly 60. If desired, any of the LED sources 72a, 72d may be utilized for exciting any photoluminescent material 96 disposed proximately to and/or on the light source 38.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light source 38. For example, a central portion 120 of the light-producing assembly 60 may have a greater density of LED sources 72 than peripheral portions 118, or vice versa. In such embodiments, the light source 38 may appear brighter or have a greater luminance in order to preferentially illuminate pre-defined locations. In other embodiments, the density of LED sources 72a, 72d may increase or decrease with increasing distance from a preselected point.

According to one embodiment, the light strip 18 includes a higher concentration of LED sources 72d proximate desired exterior features 28, such as the door handles 32, with lower concentrations therebetween. According to an alternate embodiment, the density of LED sources 72a, 72d may vary along the vehicle 14 longitudinally and the light strip 18 may illuminate in a first color proximate a desired feature 28, such as a door handle 32, and in a second color in a second portion further from the desired feature 28. Such a configuration may illuminate desired features 28 and provide ambient lighting simultaneously.

Figure 5:
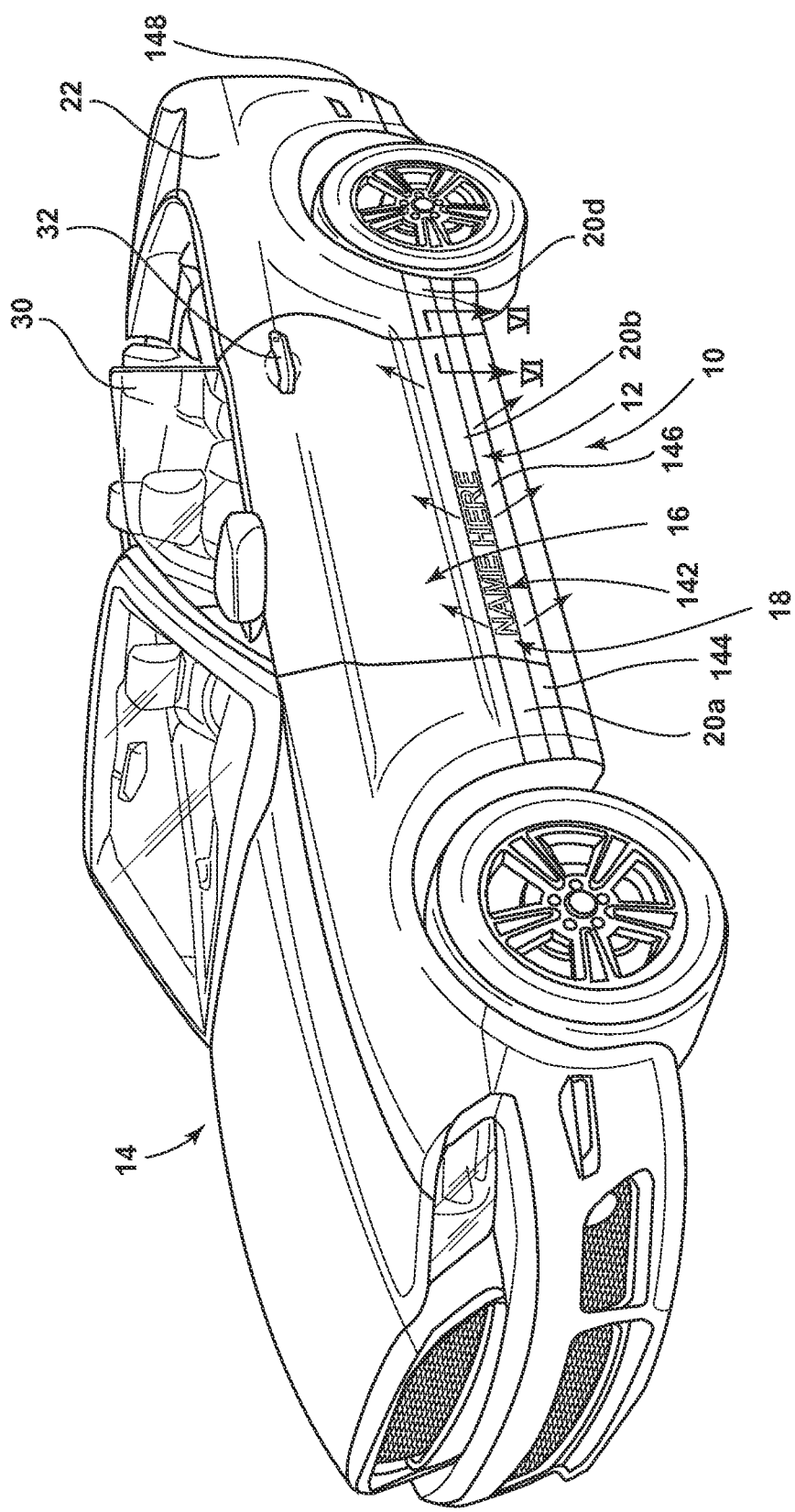
FIG. 5 illustrates a perspective view of a vehicle having a light-producing assembly attached to a body panel thereof and extending around an outer portion of the body panel.

Referring to FIG. 5, the lighting system 10 is configured as a light strip 18 disposed on a bottom portion of the exterior portion of the vehicle body located on a side of the vehicle 14. The light strip 18 is configured to illuminate outwardly from the vehicle 14. It should be appreciated that the lighting system 10 may be of any practicable and/or any desired shape. As illustrated, the light strip 18 emits light in a vehicle outward orientation. However, it is contemplated that the emitted light may be directed in any desired direction depending on the structure and packaging of the lighting system 10 employed on the vehicle 14.

According to the illustrated embodiment, the light strip 18 includes three portions 20a, 20b, 20d that are orientated such that the three portions 20a, 20b, 20d appear as a single, substantially continuous trim component on the vehicle 14. The first portion 20a may extend along a portion of a front fender 144. A second portion 20b may extend along a portion of the driver's side door 146. A third portion 20d may extend along a portion of a rear fender 148. It should be appreciated that the lighting system may be compartmentalized into any desired number of portions that may be disposed on any portion of the vehicle 14. Further, it should also be appreciated that the light strip 18 may be disposed on the outer panel 22, or alternatively, on a feature 28 of the vehicle 14. For example, the light strip 18 may include a first portion that extends along the body of the vehicle 14 and a second portion that is disposed on the door handle 32 of the vehicle 14. The thin design of the lighting system may advantageously allow the lighting system 10 to fit into small package spaces of the vehicle 14 where traditional light sources may not be practicable.

According to one embodiment, the light strip 18 extends along the side of the vehicle 14 and may be configured to illuminate in white and amber colors. The white may be used during a welcome and/or farewell sequence as an occupant ingresses or egresses from the vehicle 14 for decoration. The illumination may continue for a first set period of time after exiting the vehicle 14. For example, the light strip 18 may maintain the illuminated state for two minutes after a vehicle transmission is placed in a park position. After the two minute period, the lighting system 10 may then revert to a low intensity decoration mode for a second set time. The second set time, according to one embodiment, may be two hours. In addition to the advantageous decoration created by the lighting system 10 described herein, the vehicle 14 may also be easier to locate in the dark conditions from longer distances than a keyless entry system normally permits since many occupants may return to the vehicle 14 during the second set time period. It is also contemplated that illumination while the vehicle engine is in the off position may be eliminated and/or discontinued if the vehicle 14 detects the battery therein has a minimal power supply.

According to an alternate embodiment, the light strip 18 may transition from a first color (e.g., white) to a second color (e.g., amber) as an occupant of the vehicle 14 enters the vehicle 14 and starts the engine thereof. Thereafter, the light strip 18 may maintain the second color until a predefined condition is met, such as a door 146 of the vehicle 14 being opened. For example, if a door 146 is opened, the light strip 18 portion on the ajar door 146 may revert back to the first color.

The additional illumination provided by the light strip 18 when the vehicle engine is running may offer added safety benefits, such as making the vehicle 14 more visible from the side. Additionally, in some embodiments, the amber strip may function as an auxiliary turn signal, and may replace a turn signal disposed in a side mirror of the vehicle 14, for even greater visibility and safety. The amber strip may also work with the emergency flashers.

According to an alternate embodiment, both white and amber may flash when an anti-theft system is activated to draw more attention to the vehicle 14. Normal intensity may also vary with the environmental lighting conditions. Doing so enables the luminescence exhibited by the light strip 18 to be sufficiently visible based on current lighting conditions. For example, the light source 38 may provide illumination at a much higher intensity during the day than at night. Furthermore, the intensity of illumination provided by the light strip 18 may also dynamically vary based on the speed of the vehicle 14.

Additionally, emblems and/or indicia 142 may be disposed on and/or proximately to the light strip 18 that may contain photoluminescent materials that are excitable by the light source 38 and/or backlit by variable concentrations of LED sources 72 along the light strip 18.

Figure 6:
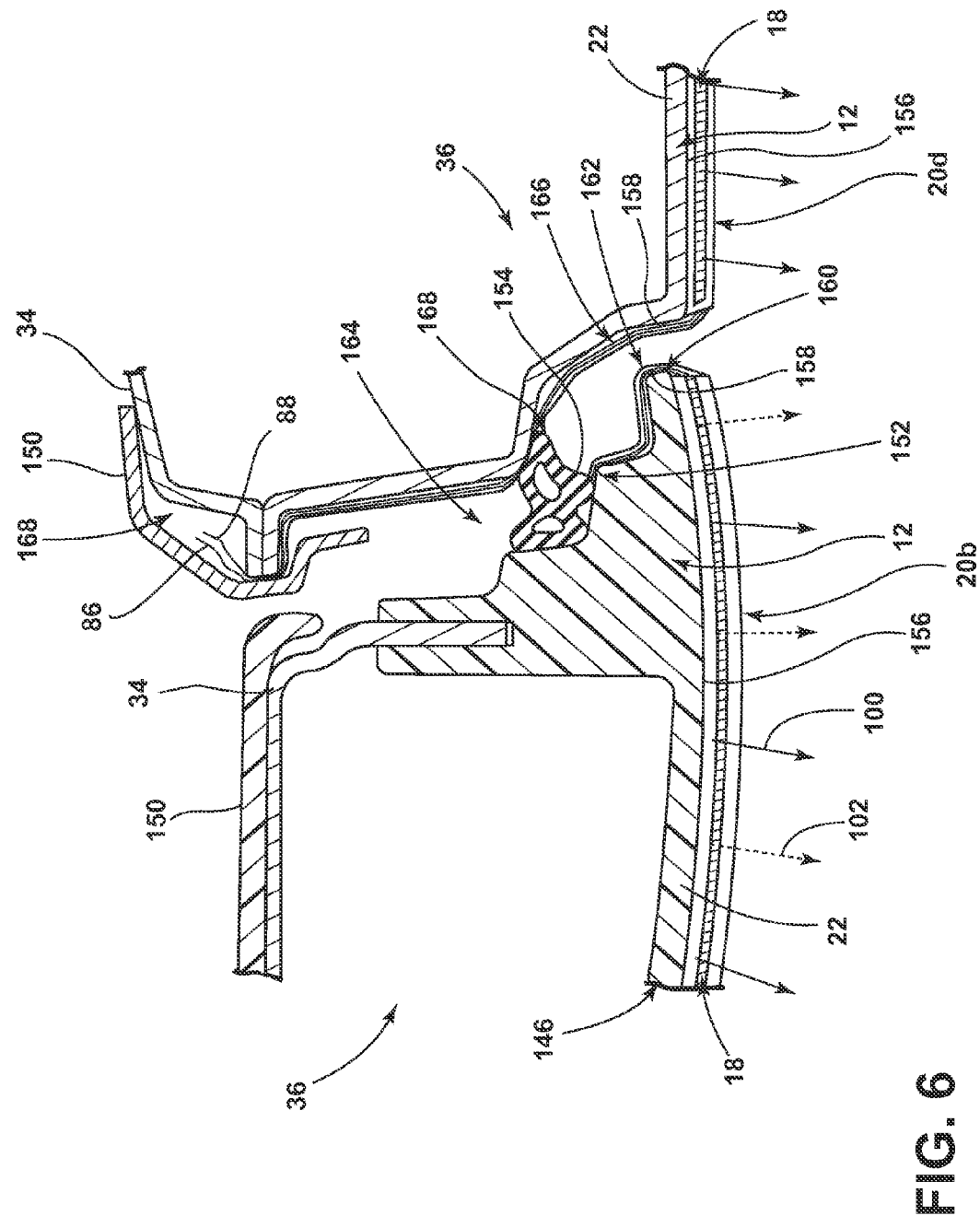
FIG. 6 illustrates a cross-sectional view taken along the line VI-VI of FIG. 5 illustrating the light-producing assembly attached to a vehicle panel according to one embodiment.

Referring to FIG. 6, an exemplary cross section of two portions 20b, 20d of the light strip 18, vehicle body panel 12, and inner panels 34 illustrated in FIG. 5 are shown taken along line VI-VI. The second portion 20b of the light strip 18 is disposed on the door 146. The door 146 may include an outer panel 22, an inner panel 34, and/or a trim member 150, among various other components.

As illustrated, the light strip 18 is disposed on a first surface 156 of the outer panel 22. A shoulder 152 to which a seal 154 is attached is formed on a second surface 158 of the outer panel 22. A peripheral wall portion of the inner panel 34 is adapted to couple with the second surface 158 of the outer panel 22. The rubber seal 154 has a lip portion 168 and the lip portion 168 is in close contact with the rear fender 148 of the vehicle 14 when the door 146 is placed in the closed position. The seal 154 is configured to protect the interior of the vehicle 14 from washing water, rain and the like entering the vehicle 14 through the door 146. Likewise, the rear fender 148 includes an outer panel 22 configured to attach to an inner panel 34. An interior trim member 150 may also be disposed over the inner panel 34.

As illustrated, the second portion 20b of the light strip 18 is disposed on the door 146 and attached thereto. For example, the light strip 18 may be attached to the door 146 through use of an adhesive. An indent 160 may be placed in the door 146 at the intersection 162 of the first and second surfaces 156, 158. The light strip 18 extends around the intersection 162 of the door 146 and is disposed in the indent 160. Such a configuration may cause a sharp bend in the light strip 18. Due to the sharp bend, the conductive leads 86, 88, which may be copper, aluminum, metallic foil, and/or wire may be over molded with the overmold material 66 making the light strip 18 be flush with sheet metal. It should be appreciated that a similar configuration may be utilized within a door handle aperture, the wheel wells of the vehicle 14, a lighting system disposed on the vehicle 14 (e.g., front headlamps, rear headlamps, etc.), and/or any other location on the vehicle 14 wherein the conductive leads 86, 88 may be received within the vehicle 14 without the need of an aperture 44 in a vehicle panel 12 of the vehicle 14.

The conductive leads 86, 88, and overmold material 66 may be of any practicable orientation within the door jamb 164 of the vehicle 14. As illustrated, a portion of the light strip 18 is disposed between the outer panel 22 and door seal 154 of the vehicle 14 to better conceal an unilluminable portion 166 of the light strip 18. Similarly, a portion 20d of the light strip 18 has an unilluminable portion 166 containing the conductive leads 86, 88, and the overmold material 66. The unilluminable portion 166 of the third portion of light strip 18 may extend along a portion of the outer panel 22 and extend to an area 168 behind the interior trim member 150 to conceal the unilluminable portion 166 of the light strip 18.

Still referring to FIG. 6, the second portion of the light strip 18 may include a plurality of independent portions configured to emit light of a first wavelength and a second wavelength. Each differing portion may have a unique bus and conductive leads 86, 88 extending therefrom to the controller 78, as described above. Each of the conductive leads 86, 88 may extend through the unilluminable portion 166 of the light strip 18. The unilluminable portion 166 may be of any desired thickness to house and protect any desired number of conductive leads 86, 88.

Figure 7:
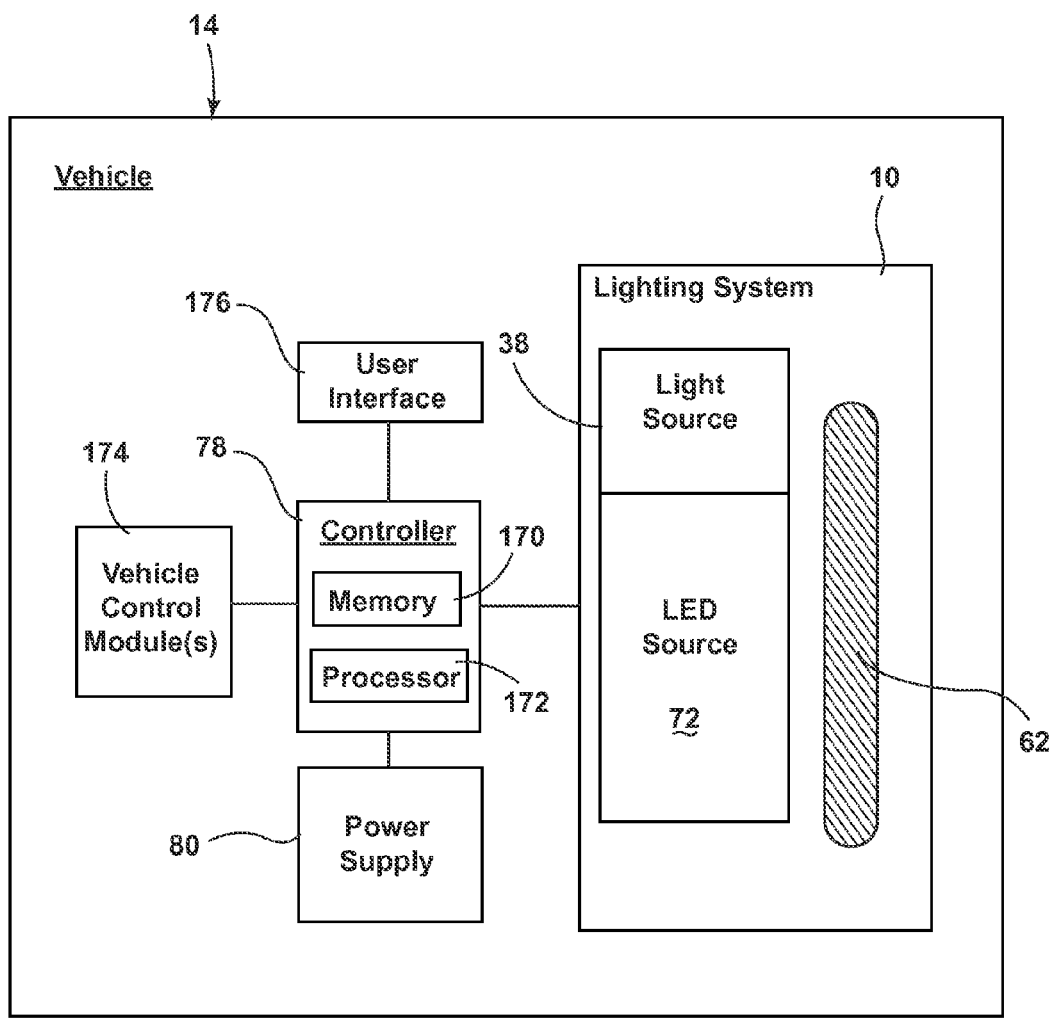
FIG. 7 is a block diagram of the vehicle and the lighting system.

Referring to FIG. 7, a block diagram of a vehicle 14 is generally shown in which the lighting system 10 is implemented. The lighting system 10 includes a controller 78 in communication with the light source 38. The controller 78 may include memory 170 having instructions contained therein that are executed by a processor 172 of the controller 78. The controller 78 may provide electrical power to the light source 38, or to a respective bus bar 82, 84, via a power source 80 located onboard the vehicle 14. In addition, the controller 78 may be configured to control the light emitted 100 from each light source 38 based on feedback received from one or more vehicle control modules 174 such as, but not limited to, a body control module, engine control module, steering control module, brake control module, the like, or a combination thereof. By controlling the light emitted 100 the light source 38, the lighting system 10 may illuminate in a variety of colors and/or patterns to provide an aesthetic appearance, or may provide vehicle information to an intended observer. For example, when the lighting system 10 is illuminated, the light-producing assembly 60 may illuminate a desired feature 28 of the vehicle 14, such as a door handle 32.

In operation, the photoluminescent structure 62 may exhibit periodic unicolor or multicolor illumination. For example, the controller 78 may prompt the light source 38 to periodically emit only the first wavelength of light 100 via the LED sources 72 to cause the photoluminescent structure 62 to periodically illuminate in the first color. Alternatively, the controller 78 may prompt the light source 38 to periodically emit only the second wavelength of light 100 via LED sources 72 to cause the photoluminescent portion to periodically illuminate in the second color. Alternatively, the controller 78 may prompt the light source 38 to simultaneously and periodically emit the first and second wavelengths of light 100 to cause the photoluminescent structure 62 to periodically illuminate in a third color defined by an additive light mixture of the first and second colors. Alternatively still, the controller 78 may prompt the light source 38 to alternate between periodically emitting the first and second wavelengths of light to cause the photoluminescent structure 62 to periodically illuminate by alternating between the first and second colors. The controller 78 may prompt the light source 38 to periodically emit the first and/or second wavelengths of light at a regular time interval and/or an irregular time interval. Moreover, varying portions of the light strip 18 may include varying photoluminescent materials and/or concentrations of LED sources 72 therein. Such a configuration creates a light strip 18 that may light up in a plurality of colors and/or intensities contemporaneously along the light strip 18.

In another embodiment, the lighting system 10 may include a user interface 176. The user interface 176 may be configured such that a user may control the wavelength of light 100 that is emitted by the LED sources 72 and/or the LED sources 72 that are illuminated. Such a configuration may allow a user to control which features 28 are illuminated (e.g., ambient lighting, feature 28 illumination, turn signals, etc.).

With respect to the above examples, the controller 78 may modify the intensity of the emitted first and second wavelengths of light by pulse-width modulation or current control. In some embodiments, the controller 78 may be configured to adjust a color of the emitted light by sending control signals to adjust an intensity or energy output level of the light source 38. For example, if the light source 38 is configured to output the first emission at a low level, substantially all of the first emission may be converted to the second emission. In this configuration, a color of light corresponding to the second emission may correspond to the color of the emitted light from the lighting system 10. If the light source 38 is configured to output the first emission at a high level, only a portion of the first emission may be converted to the second emission. In this configuration, a color of light corresponding to mixture of the first emission and the second emission may be output as the emitted light. In this way, each of the controllers 78 may control an output color of the emitted light.

Though a low level and a high level of intensity are discussed in reference to the first emission 100, it shall be understood that the intensity of the first emission 100 may be varied among a variety of intensity levels to adjust a hue of the color corresponding to the emitted light 100, 102 from the lighting system 10. As described herein, the color of the second emission 102 may be significantly dependent on the particular photoluminescent materials 96 utilized in the photoluminescent structure 62. Additionally, a conversion capacity of the photoluminescent structure 62 may be significantly dependent on a concentration of the photoluminescent material 96 utilized in the photoluminescent structure 62. By adjusting the range of intensities that may be output from the light source 38, the concentration, types, and proportions of the photoluminescent materials 96 in the photoluminescent structure 62 discussed herein may be operable to generate a range of color hues of the emitted light by blending the first emission with the second emission.

Accordingly, a lighting system incorporated into a body panel has been advantageously provided herein. The body panel retains its structural and protective properties while providing luminescent light having both functional and decorative characteristics.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by its language expressly state otherwise.

What is claimed is:

1. A body panel for a vehicle, comprising:
   a panel having an aperture provided therein;
   a light-producing assembly comprising a plurality of light sources arranged as a strip attached to a portion of the panel; and
   a photoluminescent structure on the light-producing assembly configured to luminesce in response to excitation by the plurality of light sources, wherein the plurality of light sources is dispersed in a variable density along the strip such that portions of the photoluminescent structure located above occupant seating areas exhibit a greater degree of luminescence than portions of the photoluminescent structure located above non-occupant seating areas.

2. The body panel of claim 1, further comprising:
   a retention feature coupled to the light-producing assembly and insertable through the aperture for disposing the light-producing assembly on the panel.

3. The body panel of claim 1, wherein the panel includes an outer panel and an inner panel and a cavity is formed therebetween.

4. The body panel of claim 3, further comprising:
   a set of conductive leads disposed through the aperture and into the cavity.

5. The body panel of claim 1, wherein the plurality of light sources comprises LEDs dispersed in a printed LED arrangement.

6. The body panel of claim 1, wherein a first portion of the photoluminescent structure is located proximate a vehicle feature and exhibits a first intensity of luminescence and a second portion of the photoluminescent structure is located further from the vehicle feature and exhibits a second, lower intensity of luminescence while illuminated.

7. The body panel of claim 1, wherein the light-producing assembly is configured to illuminate in a plurality of colors.

8. A lighting system for a vehicle, comprising:
   a panel having a light-producing assembly disposed on a first surface and a second surface offset from the first surface;
   a photoluminescent structure on the panel, wherein the light-producing assembly is configured to excite greater degrees of luminescence proximate an occupant seating area than portions located above non-occupant seating areas; and
   an overmold material disposed over the light-producing assembly at an intersection of the first and second surfaces.

9. The lighting system for a vehicle of claim 8, further comprising:
   a controller for selectively activating the plurality of light sources.

10. The lighting system for a vehicle of claim 8, wherein the plurality of light sources comprises LEDs dispersed in a printed LED arrangement.

11. The lighting system for a vehicle of claim 8, wherein the light-producing assembly illuminates indicia disposed over a portion of the light-producing assembly.

12. The lighting system for a vehicle of claim 11, wherein the overmold material and a conductive lead are disposed in an indent in the panel at an intersection of the first and second surfaces of the panel.

13. A lighting system for a vehicle, comprising:
    a first light-producing assembly disposed on a fender of said vehicle;
    a second light-producing assembly disposed on a door of said vehicle, wherein the first and second light-producing assemblies are co-planar and each includes a plurality of light sources dispersed at variable densities; and
    a photoluminescent structure configured to luminesce in greater degrees proximate a location relative to occupant seating areas than portions located above non-occupant seating areas.

14. The lighting system for a vehicle of claim 13, further comprising a controller for selectively activating the plurality of light sources.

15. The lighting system for a vehicle of claim 13, wherein the first and second light-producing assemblies appear as a single, continuous illuminated trim component.

16. The lighting system for a vehicle of claim 15, wherein the first and second light-producing assemblies are disposed proximate to one another so as to appear as a single continuous strip.

17. The lighting system for a vehicle of claim 13, wherein the plurality of light sources comprises LEDs dispersed in a printed LED arrangement.

18. The lighting system for a vehicle of claim 13, wherein the plurality of light sources are dispersed such that portions of the photoluminescent structure proximate to a vehicle feature exhibit a greater degree of luminescence than portions of the photoluminescent structure located remotely from the feature.

19. The lighting system for a vehicle of claim 13, wherein the first and second light-producing assemblies each illuminate in a first and a second color.

* * * * *